(12) United States Patent
Huomo et al.

(10) Patent No.: US 8,126,474 B2
(45) Date of Patent: Feb. 28, 2012

(54) STREAMING QUALITY OPTIMIZATION

(75) Inventors: Miikka Huomo, Vantaa (FI); Tomi Weckström, Hki (FI); Renaud Cuny, Espoo (FI); Tomi J. Varonen, Helsinki (FI); Sakari Angervuori, Hki (FI); Atte Artamo, Helsinki (FI); Erkka Ala-Tauriala, Helsinki (FI)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 11/504,090

(22) Filed: Aug. 15, 2006

(65) Prior Publication Data

US 2008/0043697 A1      Feb. 21, 2008

(51) Int. Cl.
*H04W 72/00*      (2009.01)

(52) U.S. Cl. .................. 455/452.1; 455/432.1; 455/433; 455/450; 455/451; 455/452.2; 455/550.1; 370/310.2; 370/328; 370/329; 370/338; 370/341; 370/348

(58) Field of Classification Search ............... 455/41.2, 455/41.3, 432.1, 433, 450, 451, 452.1, 452.2, 455/550.1; 370/310.2, 328, 329, 338, 341, 370/348

See application file for complete search history.

(56) References Cited

U.S. PATENT DOCUMENTS

| | | | | |
|---|---|---|---|---|
| 6,081,731 A | * | 6/2000 | Boltz et al. ................ | 455/565 |
| 6,169,898 B1 | * | 1/2001 | Hsu et al. .................. | 455/432.3 |
| 6,683,853 B1 | * | 1/2004 | Kannas et al. ............. | 370/237 |
| 6,909,719 B1 | * | 6/2005 | Petersson et al. ......... | 370/395.21 |
| 6,944,473 B2 | * | 9/2005 | Irwin et al. ................. | 455/550.1 |
| 7,289,489 B1 | * | 10/2007 | Kung et al. ................. | 370/352 |
| 2002/0132611 A1 | | 9/2002 | Immonen et al. | |

FOREIGN PATENT DOCUMENTS

| | | | |
|---|---|---|---|
| EP | 1 395 005 A1 | | 3/2004 |
| EP | 1395005 | * | 3/2004 |
| WO | WO2005-112371 | * | 11/2005 |
| WO | WO 2005/112371 A1 | | 11/2005 |

OTHER PUBLICATIONS

3GPP, TS 23.107 version 6.4.0 ETSI TS 123 107 v6.4.0; Digital Cellular Telecommunications System (Phase 2+); Universal Mobile Telecommunications System (UMTS); Quality of Service (QoS) Concept & Architecture (Release 6); pp. 1-41; Mar. 2006.

International Search Report, PCT/IB2007/002268 filed Aug. 7, 2007.

3GPP TS 23.060 V6.11.0, 3$^{rd}$ Generation Partnership Project; Technical Specification Group Services And System Aspects; General Packet Radio Service (GPRS)Service description; Stage 2(Release 6), Dec. 2005, pp. 1-212.

3GPP Ts 24.008 V6.7.0, 3$^{rd}$ Generation Partnership Project; Technical Specification Group Core Network; Mobile Radio Interface Layer 3 Specification; Core Network Protocols; Stage 3 (Release 6), Jan. 2005, pp. 1-507.

* cited by examiner

*Primary Examiner* — Steve D Agosta

(74) *Attorney, Agent, or Firm* — Harrington & Smith

(57) ABSTRACT

An apparatus and method thereof include a service support node. The service support node is configured to read an override feature defined therein by an operator indicative of whether a maximum bitrate requested by a mobile station is to be used in a quality of service negotiation or whether the maximum bitrate from a register is to be used in a quality of service negotiation.

20 Claims, 3 Drawing Sheets

STREAMING QUALITY OPTIMIZATION

BACKGROUND OF THE INVENTION

1. Field of the Invention

The present invention relates to an apparatus and method enabling a network operator to control a maximum bitrate in a communication system.

2. Description of the Related Art

One of the main functions of a Gateway General Packet Radio Service support node (GGSN) involves interaction with external Internet Protocol (IP) packet networks providing connections to Internet Service Providers (ISPs). From an external IP network's point of view, the GGSN acts as a router for IP addresses of all subscribers served by General Packet Radio Service (GPRS) networks. The GGSN also exchanges routing information with the external IP network. A serving GPRS support node (SGSN) serves all GPRS subscribers that are physically located within the geographical SGSN service area. It forwards incoming and outgoing IP packets addressed to or from a mobile station.

A controller manages Radio Access Bearers for user data, the radio network and mobility. The controller may be a base station controller (BSC) for a second generation mobile system such as GSM, or may be a single radio network controller (RNC) for a third generation mobile system such as Universal Mobile Communication System (UMTS). The Radio Base Station often called also Base Station BS or in 3GPP Node B, provides the radio resources and communicates with the user equipment over an interface.

In Universal Mobile Telecommunications System (UMTS) networks, one attribute or parameter is a Maximum Bitrate (MBR). There is a Maximum Bitrate associated with an uplink (e.g., from a mobile station to a mobile communications network) and a second Maximum Bitrate associated with a downlink (from the mobile communications network to the mobile station). MBR attributes define a data rate upper limit associated with a Quality of Service (QoS) level subscribed for by a subscriber.

Currently, several commercial streaming servers tend to send bursts of data at a beginning of data transmission and, sometimes, in the middle of streaming sessions. As several mobile stations request relatively low MBR values in a Packet Data Protocol (PDP) context activation (usually MBR equals Guaranteed Bitrates (GBR)), an core network polices and shapes data exceeding the MBR value requested by the mobile stations. This shaping results in bad streaming user experience as data is buffered and dropped. Also, if GBR is set too low there may not be enough resources reserved for the connection.

Therefore, there is a need for a device and method for enabling a network operator to influence the policing in the network.

SUMMARY OF THE INVENTION

In accordance with an embodiment of the present invention, there is provided an apparatus, including a determining unit configured to read an override feature defined therein by an operator indicative of whether a maximum bitrate requested by a mobile station is to be used in a quality of service negotiation or whether the maximum bitrate from a register is to be used in a quality of service negotiation.

In accordance with an embodiment of the present invention, there is also provided a network element including a determining unit configured to determine whether an override feature is activated by an operator, to use a maximum bitrate from a home location register to perform a quality of service negotiation with a network if the override feature is activated, and to use the maximum bitrate from a mobile station to perform the quality of service negotiation with the network if the override feature is deactivated. A receiving unit is configured to receive the quality of service negotiated with the network.

Furthermore, in accordance with an embodiment of the present invention, there is provided a method, including receiving a maximum bitrate from a mobile station requested for a quality of service negotiation, defining an override feature by an operator in a service support node, and based on the override feature, determining whether the maximum bitrate requested by the mobile station is to be used in the quality of service negotiation or whether the maximum bitrate from a register is to be used in a quality of service negotiation.

In accordance with an embodiment of the present invention, there is provided a method, including receiving a maximum bitrate from a mobile station requested for a quality of service negotiation, and determining whether an override feature is activated by an operator. The method further comprises using the maximum bitrate from a home location register to perform a quality of service negotiation with a network if the override feature is activated, using the maximum bitrate from the mobile station to perform a quality of service negotiation with the network if the override feature is deactivated.

Also, in accordance with an embodiment of the present invention, there is provided a computer program embodied on a computer readable medium, the computer program being configured to perform receiving a maximum bit rate from a mobile station requested for a quality of service negotiation, defining an override feature by an operator in a service support node, and based on the override feature, determining whether the maximum bitrate requested by the mobile station is to be used in the quality of service negotiation or whether the maximum bitrate from a register is to be used in a quality of service negotiation.

In accordance with an embodiment of the present invention, there is provided a computer program embodied on a computer readable medium, the computer program being configured to perform receiving a maximum bitrate from a mobile station requested for a quality of service negotiation, and determining whether an override feature is activated by an operator. The computer program further comprises using the maximum bitrate from a home location register to perform a quality of service negotiation with a network if the override feature is activated, using the maximum bitrate from the mobile station to perform a quality of service negotiation with the network if the override feature is deactivated.

In accordance with an embodiment of the present invention, there is provided a network element including determining means for determining whether an override feature is activated by an operator, to use a maximum bitrate from a home location register to perform a quality of service negotiation with a network if the override feature is activated, and to use the maximum bitrate from a mobile station to perform the quality of service negotiation with the network if the override feature is deactivated. Receiving means is provided for receiving the quality of service negotiated with the network.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. The embodiments of the present invention described below provides an apparatus including a streaming quality optimization network element and method which enables a network operator to define that a Maximum Bitrate (MBR) received from a Home Location Register (HLR) be used in Quality of Service (QoS) negotiation instead of the MBR requested by a mobile station.

Network communication providers attempt to allocate resources to maximize efficiency. For example, in Universal Mobile Communication System (UMTS) networks, there is an effort to allocate only the appropriate bandwidth for any particular communication session. The appropriateness of a particular bandwidth allocation is determined based on a QoS level subscribed for by a communication service subscriber and the needs of a particular communications application. For instance, e-mail and messaging traffic may need a lower QoS (i.e., bitrate) than voice or video communication sessions. Additionally, in order to conserve network resources so that the resources can be allocated to subscribers who have paid for, or are willing to pay for high bandwidth, it is important that subscribers that do not need, or are unwilling to pay for broadband communication are not allocated network resources beyond those that are necessary to provide the communication services that are required or subscribed for. Part of the process of allocating appropriate resources is a negotiation between network components to establish an agreement about communication attributes or parameters associated with a particular communication session.

In UMTS networks, for instance, one of those attributes or parameters is a Maximum Bitrate (MBR). In one embodiment, there may be a first MBR associated with an uplink (i.e., from a mobile station to a mobile communications network) and a second MBR associated with a downlink (from the mobile communications network to the mobile station). MBR attributes define a data rate upper limit associated with a QoS level subscribed for by a subscriber. Guaranteed Bitrates (GBR) may define lower limits for the Quality of Service level. GBR may be used to facilitate admission control based on available resources, and for resource allocation within UMTS.

Figure 1:
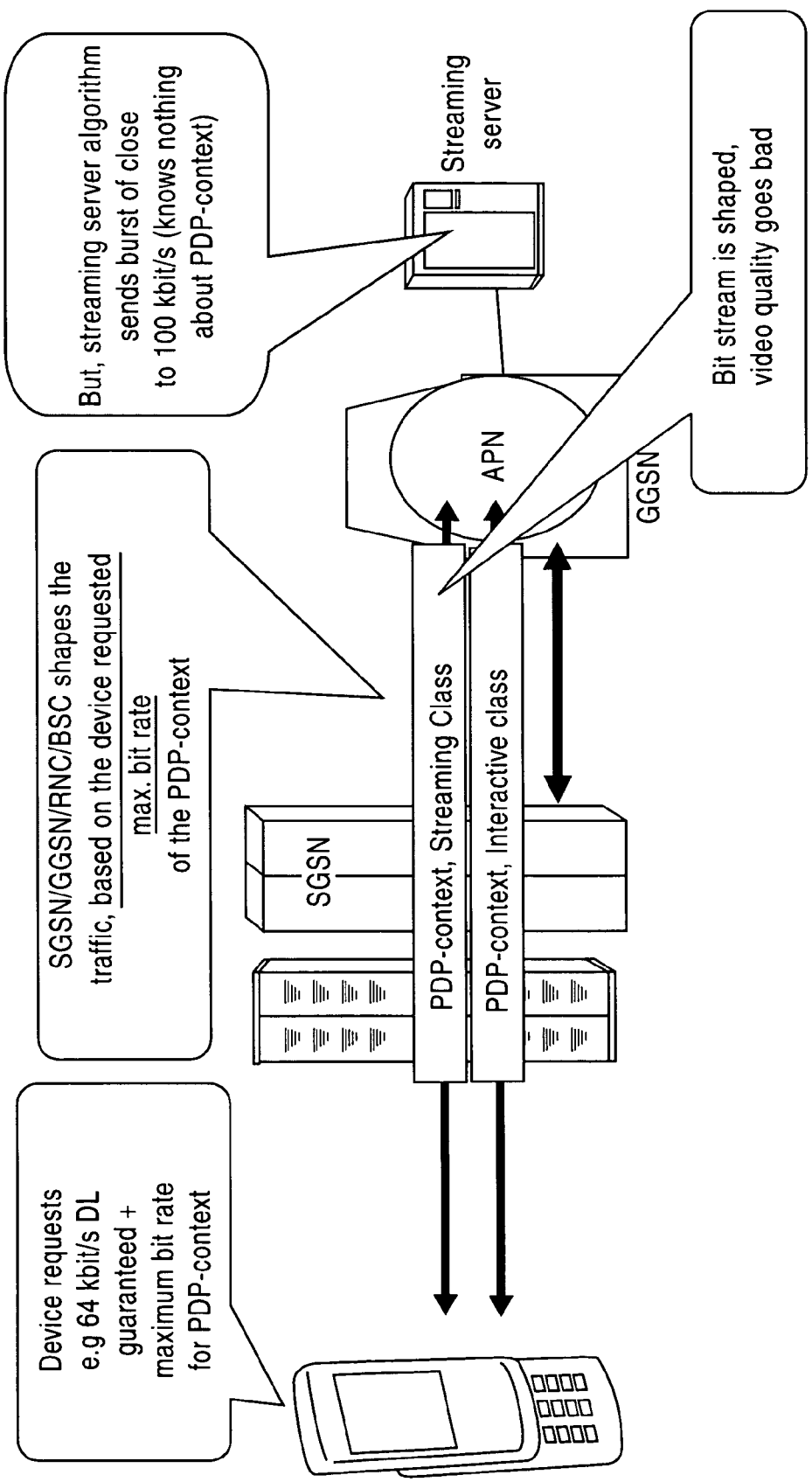
FIG. 1 illustrates challenges identified in a communication system pertaining to a requested Maximum Bitrate by a mobile station, in accordance with an embodiment of the present invention.

However, QoS negotiations are not as efficient as they could be. In some instances, when a mobile station or an application running on a mobile station, requests a particular MBR, that request is simply granted or accommodated. Streaming servers are usually not controllable by a network operator and are, therefore, unaware of the negotiated QoS by a network. The network performs the QoS negotiation according to the mobile station MBR requested values. If the mobile station requests too low of an MBR, the streaming service provided by the streaming server may be less than optimal. The streaming server is not authorized to intervene. As illustrated in FIG. 1, for example, a mobile station may request that, for instance, 64 kbit/s data link be guaranteed and MBR for packet data protocol (PDP) context. A radio network controller or base station controller, a serving GPRS (general packet radio service) support node (SGSN), and a Gateway GPRS support node (GGSN) would shape data traffic based on the guaranteed and maximum bitrate defined by the mobile station. However, because the streaming server would not know about the MBR for the PDP context requested by the mobile station, a bit stream from the streaming server would be shaped differently, thereby deteriorating data transmission, such as poor video quality.

To resolve such poor data transmission, in accordance with an embodiment of the present invention, there is provided an apparatus and a method allowing a network operator to influence the policing done in a network. The apparatus and method, to be described with reference to FIGS. 2 and 3, allow the network operator to define in a streaming quality optimization network element, such as an SGSN, as described in accordance with an embodiment of the present invention, whether an MBR from an HLR is to be used in QoS negotiation or the MBR requested by a mobile station.

Figure 2:
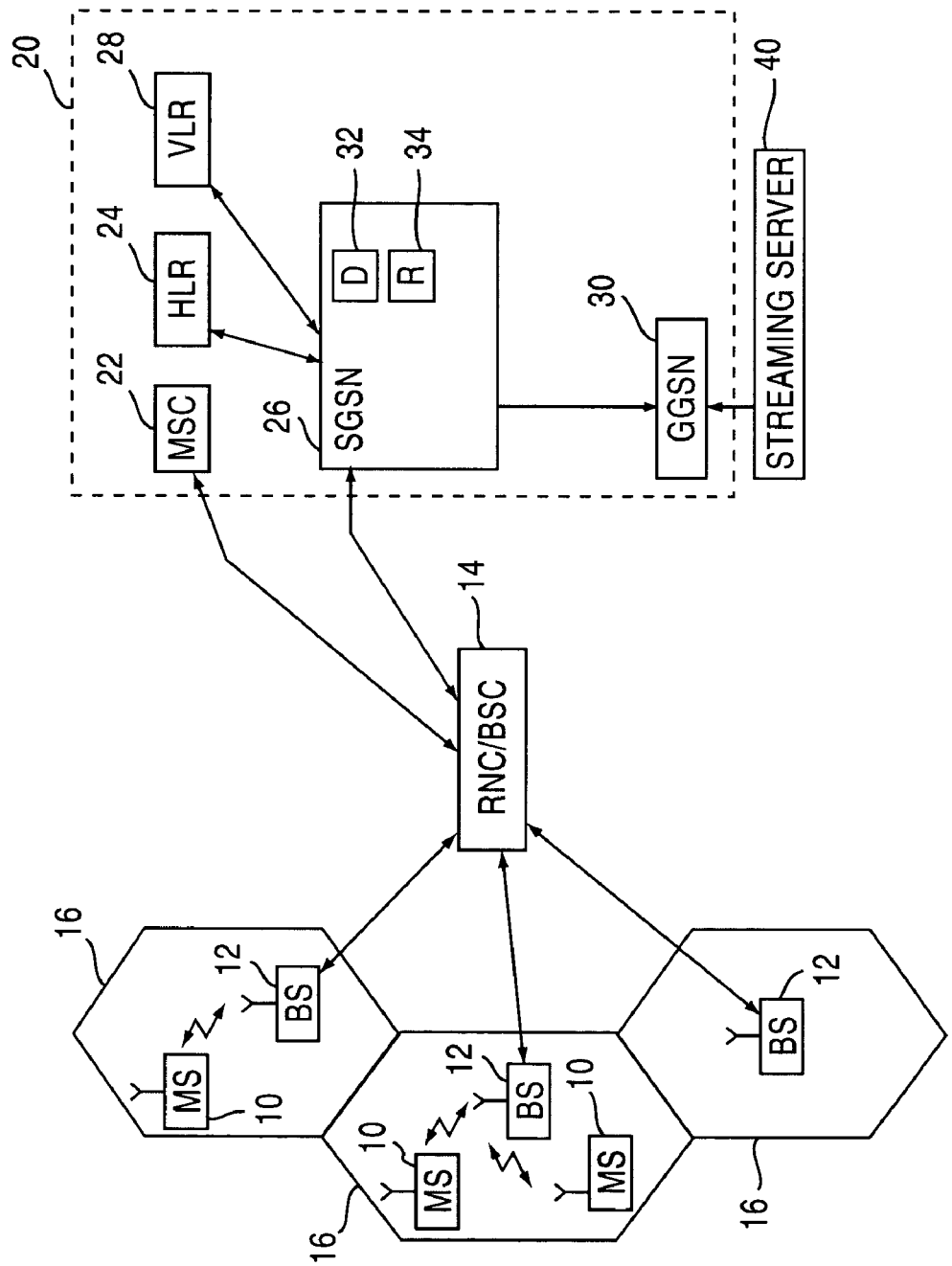
FIG. 2 illustrates a general logical architecture of a communications system, in accordance with an embodiment of the present invention.

FIG. 2 illustrates a general logical architecture of a communications system in which embodiments of the present invention may be implemented, in accordance with an embodiment of the present invention. In accordance with an embodiment of the present invention, the apparatus and method of the present invention may be applied to any type of access technologies, including multi-access technology, as streaming services are used. The access technology may be Global System for Mobile Communication (GSM)/Edge Radio Access Network (GERAN), UMTS Terrestrial Radio Access Network (UTRAN), Wireless Local Area Network (WLAN), Ultra Wideband Medium Access Protocol (UMA), Worldwide Interoperability for Microwave Access (WIMAX), Internet-High Speed Packet Access (I-HSPA), 3.9 G 4 G, etc.

Various user equipment such as computers (fixed or portable), mobile telephones, and personal data assistants or organizers are known to those skilled in the art which may be used to access the Internet to obtain services. Mobile stations are one example of user equipment that may communicate via a wireless interface with another device, such as a base station of a mobile telecommunication network or any other station.

The term "service" used above and hereinafter will be understood to broadly cover any service, which a subscriber may desire, require or be provided with. The term also may be understood to cover the provision of complimentary services. In particular, but not exclusively, the term "service" may be understood to include Internet Protocol multimedia IM services, conferencing, telephony, gaming, rich call, presence, e-commerce, and messaging.

As illustrated in FIG. 2, a mobile station (MS) 10 may communicate by radio with one or more base stations (BS) 12. Each BS 12 is linked to a controller (RNC/BSC) 14. The controller (RNC/BSC) 14 may be a base station controller (BSC) for a second generation mobile system such as GSM, or may be a radio network controller (RNC) for a third generation mobile system such as UMTS. The terminology used for base station and RNC will depend on the standard. For example, base stations can be referred to as "Node B" and RNCs as "base station controllers" (BSC). It should be appreciated that the terms "base station" and "RNC" should be interpreted as also encompassing equivalent elements in other standards which perform a similar function.

Each BS 12 is further arranged such that it is capable of receiving and transmitting to MS 10 within a predefined area 16. These areas interlock and can partially overlap to create a patchwork of mobile station coverage. The RNC/BSC 14 can be linked to one or more BSs 12.

The RNC/BSC 14 is linked to a core network 20. The core network 20 includes one or more serving nodes that can provide communication services to a connected mobile station, for example a mobile switching centre (MSC) 22 and a SGSN 26. These units are connected to the RNC/BSC 14. The core network 20 may be also connected to other telecommunications networks such as a fixed line network, other mobile networks (e.g. another core network) or packet data networks such as the Internet or proprietary networks to allow onward connection of communications outside the network. The core network 20 may also include other units such as an HLR 24 and a visitor location register (VLR) 28 which help to control access to the network. The HLR 24 stores the subscription details of mobile station subscribers. The VLR 28 stores information on mobile stations that are currently attached to the core network 20, but which are not subscribed to that network. Such mobile stations may be referred to as roaming subscribers or visiting subscribers. The core network 20 may also include one or more charging gateway functionality entities and a billing system (not shown) for performing billing operations.

In the core network 20, each serving node such as the MSC 22 or SGSN 26 may provide a set of services to the mobile station. For example, the MSC 22 can provide circuit switched (CS) communications, for example for speech, fax or non-transparent data services, and therefore has a link to other entities in the circuit switched domain such as other CS mobile networks such as GSM (Global System for Mobile communications) and CS fixed wire networks such as conventional voice telephony networks. The SGSN 26, in turn, can provide packet switched (PS) communications, for instance, for Internet Protocol (IP) data transmission, and therefore has a link to other entities in the packet switched domain such as GPRS-equipped GSM networks and the Internet. The packet switched services may include traditional data services such as file transfer, e-mail and world-wide web (WWW) browsing, and derived data services such as voice-over-IP (e.g., by means of the H.323 protocol).

A Gateway GPRS support node (GGSN) 30 functions as a gateway between the core network elements and external networks the subscriber wishes to connect to. The external networks may include, for example, a packet switched network such as a corporate intranet or the Internet, or a separate core network belonging to another network provider. A streaming server 40 performs the functional of providing movies, audio or other playback of information on demand from a packet data network.

The division of functions between serving nodes may be specified by a system specification and may be tied to the assumed network architecture. For example there may be other nodes than the MSC 22 or the SGSN 26 providing overlapping or additional functions.

During operation, the MS 10 would send a packet data protocol (PDP) context request message to the SGSN 26. The message includes, among other parameters, the QoS requested by the MS 10. A QoS information element (QoS IE) includes among other parameters the MBR for both UL and DL direction, in accordance with 3GPP TS 24.008 v 6.7.0, January 2005, and in accordance with 3GPP TS 23.060 v 6.11.0, December 2005. Thus, the requested QoS would include, among other parameters, the MBR also being requested by the MS 10. The MS 10 may request different values for the MBR according to each traffic class.

In accordance with an embodiment of the present invention, in an override feature, the network operator may be able to define in the SGSN 26, for instance, through an operation and management interface (not shown), whether the MBR from the HLR 24 should be used for QoS negotiations or whether the MBR requested by the MS 10 should be used QoS negotiations based on specific rules or conditions. Such definition may be done numerically, as an activation/deactivation set-up, or using a Boolean value. Thus, the SGSN 26 could be configured to include a determining unit 32 to determine whether an override feature is activated by an operator, to use the MBR from the HLR 24 to perform a QoS negotiation with a network if the override feature is activated, and to use the MBR from the MS 10 to perform the QoS negotiation with the network if the override feature is deactivated. A receiving unit 34 in the SGSN 26 would receive the QoS negotiated with the network.

Thus, the network operator may override, based on specific rules or conditions, the MBR requested by the MS 10 and define the MBR to be used for QoS negotiations for each traffic class, such as interactive, streaming, and conversational. Such rules or conditions that may be implemented for the network operator to override the MBR requested by the MS 10 include: the MBR is to be overridden only for defined International Mobile Equipment Identifications (IMEIs), International Mobile Subscriber Identity (IMSI), or Access Point Names (APNs); the MBR is to be overridden when the MBR requested by the MS 10 is below the operations and maintenance defined value; the MBR is to be overridden to increase the MBR requested by the MS 10 by an operations and maintenance predefined multiplier; or the MBR is to be overridden only for specific or defined services. These services could include using the MBR of an Internet Service Node (ISN) so as to allow the MBR of the ISN to upgrade QoS over the MBR requested by the MS 10 if the service requires it.

Figure 3:
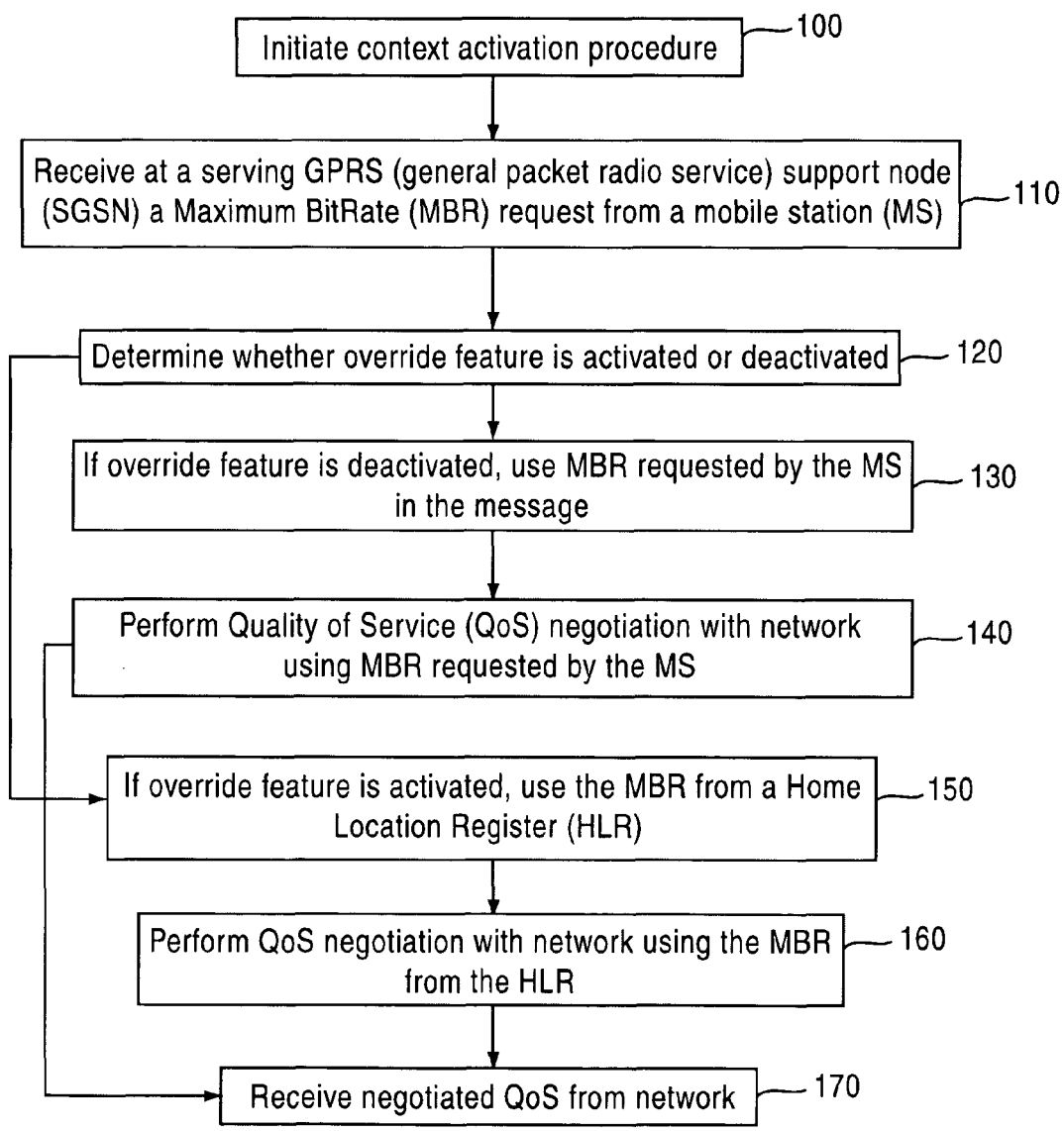
FIG. 3 illustrates a streaming quality optimization process, in accordance with an embodiment of the present invention.

In accordance with an embodiment of the present invention, FIG. 3 illustrates a streaming quality optimization process, in accordance with an embodiment of the present invention. At step 100, the process initiates a context activation procedure. At step 110, the process receives, at the SGSN 26, the MBR requested from the MS 10 in the message. At step 120, at the SGSN 26, the process reads from the SGSN 26, for instance, whether the operator has activated or deactivated the override feature in the SGSN 26. In the override feature, the operator would define whether the MBR from the HLR 24 is to be used or whether the MBR defined from the MS 10 is to be used for QoS negotiations for each traffic class, for instance. In one embodiment, Boolean values may be used in which "0" is equivalent to an indication that the QoS negotiation be done as a normal procedure, in which the MBR requested by the MS 10 would be considered. A Boolean value of "1" would be indicative that the MBR requested by the MS 10 is to be ignored in the QoS negotiation and, instead, the MBR received from the HLR 24 associated with the subscriber, for a particular traffic class, is to be used.

In accordance with an embodiment of the present invention, the network operator may define the override feature either during system initialization or at any time during packet transmission, for instance, when it is determined that the streaming service is less than optimal. In addition, if the MBR requested by the MS 10 is to be ignored, the network operator may define in the SGSN 26 the MBR to be used as some configured minimum value; as some configured minimum value defined for IMEI, IMSI, or APN; or increase the MBR requested by the mobile station by a predefined multiplier.

Referring to FIG. 3, if it is determined at step 120 that the override feature is deactivated, at step 130, the process uses the MBR requested by the MS 10. At step 140, the QoS negotiation begins with the core network 20 or another network and RNC/BSC 14 (only if Packet Flow Context (PCF) procedures are required) using the MBR requested by the MS 10. In accordance with an embodiment of the present invention, the SGSN 26 may send the negotiated QoS to the core network 20 or the other network where the QoS may still be changed. The process would then proceed to step 170. At step 170, the process receives the negotiated QoS from the core network 20 or the other network.

However, if it is determined at step 120 that the override feature is activated, at step 150, the process uses the MBR from the HLR 24. At step 160, the QoS negotiation begins with the core network 20 or the other network using the MBR from the HLR 24. In accordance with an embodiment of the present invention, the SGSN 26 may send the negotiated QoS to the core network 20 where the QoS may still be changed. The process would then proceed to step 170. At step 170, the process receives the negotiated QoS from the core network 20.

One of the many advantages of the present invention is because millions of mobile stations that request too low MBR, it is beneficial for a more effective and efficient streaming services to allow a network operator to define to the SGSN that the MBR received from the HLR is to be used in QoS negotiations instead of the MBR requested by the mobile station. Mobile stations may receive larger bursts of data than requested or than negotiated MBR.

It is to be understood that in the embodiment of the present invention, the operations are performed in the sequence and manner as shown although the order of some operations and the like may be changed without departing from the spirit and scope of the present invention. It is also to be understood that the described procedures may be applied equally well to Uplink (UL) and Downlink (DL) MBR values or to Guaranteed Bitrates (GBR).

With respect to the present invention, network devices may be any device that utilizes network data, and can include switches, routers, bridges, gateways or servers. In addition, while the terms packet or data have been used in the description of the present invention, the invention has import to many types of network data. For purposes of this invention, the term packet or data includes cell, frame, datagram, bridge protocol data unit packet, packet data and any equivalents thereof.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. An apparatus, comprising:
a determining unit configured:
to determine whether an override feature defined by an operator is activated in a message to a network from a user equipment, the override feature being indicative of which of a maximum bitrate requested by the user equipment and a maximum bitrate from a register in the network is to be used in a quality of service negotiation for a communication session,
in response to determining that the override feature is not activated, to carry out the quality of service negotiation using the maximum bitrate requested by the user equipment, where the maximum bitrate requested by the user equipment is allocated to the user equipment for the communication session, and
in response to determining that the override feature is activated, to carry out the quality of service negotiation using the maximum bitrate from a register in the network, where the maximum bitrate from the register is allocated to the user equipment for the communication session,
wherein the maximum bitrate from the register is greater than the maximum bitrate requested by the user equipment,
wherein the apparatus is further configured to allow the operator to only activate the override feature if the maximum bitrate requested by the user equipment is less than an operator configured threshold.

2. The apparatus as recited in claim 1, wherein the maximum bitrate requested by the user equipment and the maximum bitrate from the register are each defined for each traffic class associated with a subscriber.

3. The apparatus as recited in claim 1, wherein if the override feature comprises a Boolean value of zero, the apparatus uses the maximum bitrate requested by the user equipment in the quality of service negotiation and if the override feature comprises the Boolean value of one, the apparatus uses the maximum bitrate from the register.

4. The apparatus as recited in claim 1, wherein the apparatus is configured to allow the operator to define the override feature during system initialization or at any time during packet transmission.

5. The apparatus as recited in claim 1, wherein the apparatus is configured to allow the operator to define the override feature as a configured minimum value or as some configured minimum value defined for international mobile equipment identification, international mobile subscriber identity, or access point name.

6. The apparatus as recited in claim 1, wherein the apparatus is configured to allow the operator to increase the maximum bitrate requested by the user equipment by a predefined multiplier.

7. The apparatus as recited in claim 1, wherein at least one of the maximum bitrate requested by the mobile service and the maximum bitrate of the register comprises at least one of uplink and downlink maximum bitrate quality of service attributes.

8. The apparatus as recited in claim 1, wherein the apparatus is further configured to allow the operator to override the maximum bitrate requested by the user equipment to one of:
a maximum bitrate of specific international mobile equipment identifications,
the maximum bitrate of the register when the maximum bitrate requested by the user equipment is below an operations and maintenance defined value,
a maximum bitrate of at least one predefined access point name, and
a maximum bitrate of specific or defined services.

9. The apparatus as recited in claim 1, wherein the register is a home location register.

10. A method, comprising:
receiving, via a receiver, a maximum bitrate from a user equipment that is requested for a quality of service negotiation;

determining whether an override feature defined by an operator in a service support node is activated in a message to a network from the user equipment, the override feature indicative of which of a maximum bitrate requested by the user equipment and a maximum bitrate from a register in the network is to be used in a quality of service negotiation for a communication session;

in response to determining that the override feature is not activated, carrying out the quality of service negotiation using the maximum bitrate requested by the user equipment, where the maximum bitrate requested by the user equipment is allocated to the user equipment for the communication session; and in response to determining that the override feature is activated, carrying out the quality of service negotiation using the maximum bitrate from the register in the network, where the maximum bitrate from the register is allocated to the user equipment for the communication session, wherein the maximum bitrate from the register is greater than the maximum bitrate requested by the mobile communication session, further comprising only activating the override feature if the maximum bitrate requested by the user equipment is less than an operator configured threshold.

11. The method as recited in claim 10, further comprising:
defining the maximum bitrate requested by the user equipment and the maximum bitrate from the register for each traffic class associated with a subscriber.

12. The method as recited in claim 10, further comprising:
if the override feature comprises a Boolean value of zero, using the maximum bitrate requested by the user equipment in the quality of service negotiation; and
if the override feature comprises the Boolean value of one, using the maximum bitrate from the register.

13. The method as recited in claim 10, further comprising:
defining the override feature during system initialization or at any time during packet transmission.

14. The method as recited in claim 10, further comprising:
defining the override feature as a configured minimum value or as some configured minimum value defined for international mobile equipment identification, international mobile subscriber identity, or access point name.

15. The method as recited in claim 10, further comprising:
increasing, by the operator, the maximum bitrate requested by the user equipment by a predefined multiplier.

16. The method as recited in claim 10, further comprising:
configuring at least one of the maximum bitrate requested by the mobile service and the maximum bitrate of the register to comprise at least one of uplink and downlink maximum bitrate quality of service attributes.

17. The method as recited in claim 10, further comprising:
allowing the operator to override the maximum bitrate requested by the user equipment to one of:
a maximum bitrate of specific international mobile equipment identifications,
the maximum bitrate of the register when the maximum bitrate requested by the user equipment is below an operations and maintenance defined value,
a maximum bitrate of at least one predefined access point name, and
a maximum bitrate of specific or defined services.

18. A method, comprising:
receiving, via a receiver, a maximum bitrate from a user equipment requested for a quality of service negotiation;
determining whether an override feature is activated by an operator in a message to a network from the user equipment, the override feature indicative of which of a maximum bitrate requested by the user equipment and a maximum bitrate from a register in the network is to be used in a quality of service negotiation for a communication session;

in response to determining that the override feature is activated, generating a modified maximum bitrate using a maximum bitrate from a home location register to increase the maximum bitrate requested by the user equipment and using the modified maximum bitrate to perform the quality of service negotiation with the network, where the maximum bitrate from the register is allocated to the user equipment for the communication session, wherein the modified maximum bitrate is greater than the maximum bitrate requested by the user equipment; and in response to determining that the override feature is deactivated, using the maximum bitrate requested by the user equipment to perform a quality of service negotiation with the network, where the maximum bitrate requested by the user equipment is allocated to the user equipment for the communication session, further comprising only activating the override feature if the maximum bitrate requested by the user equipment is less than an operator configured threshold.

19. A computer readable medium tangibly embodying a computer program, the computer program being executable to perform:
receiving a maximum bitrate from a user equipment requested for a quality of service negotiation;
determining whether an override feature defined by an operator in a service support node is activated in a message to a network from the user equipment;
in response to determining that the override feature is activated, generating a modified maximum bitrate using a maximum bitrate from a home location register to increase the maximum bitrate requested by the user equipment and using the modified maximum bitrate to perform a quality of service negotiation with the network, where the maximum bitrate from the register is allocated to the user equipment for the communication session,
wherein the modified maximum bitrate is greater than the maximum bitrate requested by the user equipment; and
in response to determining that the override feature is deactivated, using the maximum bitrate requested by the user equipment to perform a quality of service negotiation with the network, where the maximum bitrate requested by the user equipment is allocated to the user equipment for the communication session,
where the computer program being further executable to perform only activating the override feature if the maximum bitrate requested by the user equipment is less than an operator configured threshold.

20. An apparatus, comprising:
determining means for determining whether an override feature is activated by an operator in a message to a network from a user equipment, the override feature being indicative of which of a maximum bitrate requested by the user equipment and a maximum bitrate from a register in the network is to be used in a quality of service negotiation for a communication session,
where the determining means is further for using a maximum bitrate from a home location register to increase the maximum bitrate requested by the user equipment and for using the increased maximum bitrate to perform the quality of service negotiation with the network in response to determining that the override feature is activated, where the maximum bitrate from the register is allocated to the user equipment for the communication session, and where the determining means is further for using the maximum bitrate requested by the user equipment to perform the quality of service negotiation with the network in response to determining that the override feature is deactivated, where the maximum bitrate requested by the user equipment is allocated to the user equipment for the communication session; and receiving means for receiving the quality of service negotiated with the network, wherein the maximum bitrate from the register is greater than the maximum bitrate requested by the user equipment, wherein the apparatus is further configured to allow the operator to only activate the override feature if the maximum bitrate requested by the user equipment is less than an operator configured threshold.

* * * * *